United States Patent
Berg et al.

(10) Patent No.: US 7,124,410 B2
(45) Date of Patent: Oct. 17, 2006

(54) DISTRIBUTED ALLOCATION OF SYSTEM HARDWARE RESOURCES FOR MULTIPROCESSOR SYSTEMS

(75) Inventors: Thomas B. Berg, Portland, OR (US); Bruce M. Gilbert, Beaverton, OR (US); Stacey G. Lloyd, Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 941 days.

(21) Appl. No.: 10/045,925

(22) Filed: Jan. 9, 2002

(65) Prior Publication Data

US 2003/0131043 A1  Jul. 10, 2003

(51) Int. Cl.
*G06F 9/50* (2006.01)

(52) U.S. Cl. .................. 718/104; 710/107; 710/113; 710/309; 710/317

(58) Field of Classification Search ........ 718/100–104; 710/107–113, 306, 309–312, 317
See application file for complete search history.

(56) References Cited

U.S. PATENT DOCUMENTS

| | | | |
|---|---|---|---|
| 4,968,977 A * | 11/1990 | Chinnaswamy et al. ... 340/2.24 |
| 4,980,822 A | 12/1990 | Brantley, Jr. et al. |
| 5,027,271 A | 6/1991 | Curley et al. |
| 5,161,227 A | 11/1992 | Dias et al. |
| 5,208,914 A * | 5/1993 | Wilson et al. ................. 710/39 |
| 5,313,641 A * | 5/1994 | Simcoe et al. .............. 710/242 |
| 5,371,897 A | 12/1994 | Brown et al. |
| 5,418,967 A * | 5/1995 | Simcoe et al. .............. 710/241 |
| 5,490,279 A | 2/1996 | Golbert et al. |
| 5,598,568 A * | 1/1997 | Frisch ......................... 712/29 |
| 5,630,134 A | 5/1997 | Haga |
| 5,652,885 A | 7/1997 | Reed et al. |
| 5,721,828 A * | 2/1998 | Frisch ......................... 709/217 |
| 5,761,413 A | 6/1998 | Frank et al. |
| 5,854,906 A * | 12/1998 | Van Loo ..................... 710/110 |
| 5,930,484 A | 7/1999 | Tran et al. |
| 5,974,456 A | 10/1999 | Naghshineh et al. |
| 6,260,174 B1 * | 7/2001 | Van Loo ..................... 714/811 |
| 6,360,291 B1 * | 3/2002 | Tavallaei .................... 710/306 |
| 6,484,220 B1 * | 11/2002 | Alvarez et al. ............... 710/46 |
| 6,763,418 B1 * | 7/2004 | Chou et al. ................. 710/317 |
| 6,882,649 B1 * | 4/2005 | Gura et al. ............ 370/395.42 |
| 6,892,259 B1 * | 5/2005 | Goodrum et al. ........... 710/244 |
| 6,910,108 B1 * | 6/2005 | Downer et al. ............. 711/141 |
| 6,956,851 B1 * | 10/2005 | McKeown et al. ......... 370/369 |

OTHER PUBLICATIONS

Garcia, A., "Tagged Inter Processor Communication Bus for Multiprocessor Systems," IBM Technical Disclosure Bulletin, Aug. 1991, pp. 115-121, vol. 34, No. 3.

* cited by examiner

*Primary Examiner*—Lewis A. Bullock, Jr.
(74) *Attorney, Agent, or Firm*—Abdy Raissinia

(57) ABSTRACT

A method is provided for allocating system resources across multiple nodes of a system communicating through a hardware device. The method provides for allocation of transaction units or identifiers in an allocating component for use in a multiple target component which may be in a distinct target node within the multiple node system. Based on the operations or requests that a target node receives from multiple external request source nodes, each requiring the use of target transaction unit objects such as transaction identification bits, the method provides inclusion of such information in the initial request to a target node which allows any data transmission between the source node and the target node, or the target node and the source node to be accomplished without any further intervention by the allocating component. Such component may be a local memory control agent or device.

18 Claims, 5 Drawing Sheets

DISTRIBUTED ALLOCATION OF SYSTEM HARDWARE RESOURCES FOR MULTIPROCESSOR SYSTEMS

CROSS-REFERENCE TO RELATED APPLICATIONS

The following patent applications, all assigned to the assignee of this application, describe related aspects of the arrangement and operation of multiprocessor computer systems according to this invention or its preferred embodiment.

U.S. patent application Ser. No. 10/045,795 by T. B. Berg et al., U.S. Pat. No. 6,523,362, entitled "Method And Apparatus For Increasing Requestor Throughput By Using Data Available Withholding" was filed on Jan. 9, 2002.

U.S. patent application Ser. No. 10/045,927 by T. B. Berg et al., U.S. Pat. No. 6,973,544, entitled "Method And Apparatus For Using Global Snooping To Provide Cache Coherence To Distributed Computer Nodes In A Single Coherent System" was filed on Jan. 9, 2002.

U.S. patent application Ser. No. 10/045,821 by T. B. Berg et al., U.S. Pat. No. 6,785,779, entitled "Multi-level Classification Method For Transaction Address Conflicts For Ensuring Efficient Ordering In A Two-level Snoopy Cache Architecture" was filed on Jan. 9, 2002.

U.S. patent application Ser. No. 10/045,564 by S. G. Lloyd et al., still pending, entitled "Transaction Redirection Mechanism For Handling Late Specification Changes And Design Errors" was filed on Jan. 9, 2002.

U.S. patent application Ser. No. 10/045,797 by T. B. Berg et al., U.S. Pat. No. 6,795,889, entitled "Method And Apparatus For Multi-path Data Storage And Retrieval" was filed on Jan. 9, 2002.

U.S. patent application Ser. No. 10/045,923 by W. A. Downer et al., U.S. Pat. No. 6,910,108, entitled "Hardware Support For Partitioning A Multiprocessor System To Allow Distinct Operating Systems" was filed on Jan. 9, 2002.

U.S. patent application Ser. No. 10/045,925 by T. B. Berg et al., still pending, entitled "Distributed Allocation Of System Hardware Resources For Multiprocessor System" was filed on Jan. 9, 20002.

U.S. patent application Ser. No. 10/045,926 by W. A. Downer et al., U.S. Pat. No. 6,823,498, entitled "Masterless Building Block Binding To Partitions" was filed on Jan. 9, 2002.

U.S. patent application Ser. No. 10/045,774 by W. A. Downer et al., U.S. Pat. No. 6,934,835, entitled "Building Block Removal From Partitions" was filed on Jan. 9, 2002.

U.S. patent application Ser. No. 10/045,769 by W. A. Downer et al., U.S. Pat. No. 6,938,077, entitled "Masterless Building Block Binding to Partitions Using Identifiers And Indicators" was filed on Jan. 9, 2002.

BACKGROUND OF THE INVENTION

1. Technical Field

The present invention relates to a method for use in a multiprocessor, multi-node computer system which utilizes distributed memory located in various nodes when such nodes are interconnected through a communications pathway such as a crossbar device which keeps track of data transaction identifiers. The disclosure relates to a method of allocating hardware resources in a computer system by distributing the responsibility of allocating these resources across various components in the system to improve processing speed and reduce system latency.

2. Description of the Related Art

In the past, multiprocessor computer systems utilizing groups of coordinated processing systems and distributed system resources have used hardware devices to communicate between groups of processors in a single system. Such computer systems frequently group one or more microprocessor systems along with memory, input/output controllers and other devices which are local to such processors acting as a single subsystem. Such processor subsystems are frequently coupled together through hardware devices acting as communications pathways, sometimes referred to as crossbars, which allow communications between the groups of processors allowing access to each group's memory by other groups of processors.

In such systems, it is necessary to provide information through the communications pathway so that other groups of processors may know the availability of resources available to it remotely in other nodes of the system. The related art demonstrates various methods used at controlling access to resources allocating "credit based flow control" throughout a distributed system.

U.S. Pat. No. 5,630,134 issued to Haga finds a central control apparatus which provides exclusive control to processors over specific memory locations within a shared memory region. Haga is directed at controlling access to certain memory spaces and does not anticipate management of hardware resources where such resources managed are not memory regions themselves but rather resources needed to access any arbitrary memory location. The Haga disclosure does not teach management of the resources needed to access memory contents across the system.

U.S. Pat. No. 5,027,271 issued to Curley, et al., teaches the use of an apparatus which addresses partitioning and management of system resources such as storage, terminals, and memory. The Curley patent teaches the use of system resources that are controlled and managed by the operating system software, as opposed to a method for use of hardware to allocate memory resources for use across the system.

U.S. Pat. No. 4,980,822 issued to Brantley, Jr., et al., discloses a multiprocessing system having nodes containing processors and associated memory modules with dynamically allocated storage across the entire system. The Brantley disclosure teaches a method whereby the virtual memory page table entries are constructed in such a way as to assign the location of such pages of global memory that are to be used by the processor at hand as local pages of memory. The patent also teaches a method which allows interleaving sequential accesses. The present invention does not provide for manipulating page tables to achieve the method provided.

U.S. Pat. No. 5,161,227 issued to Dias, et al., discloses a multiprocessor computer system which defines a method for optimizing exclusive control of specific memory locations shared as synchronization flags in the system. In this patent, memory locations managed by the invention are identified by software and a locking mechanism is specifically invoked with software intervention. The present invention does not require software intervention and does not utilize the method taught in Dias. Furthermore, the present invention's resource management method does not relate to memory locations, but rather to resources that support the access of a memory location when such resources are not visible to the operating software.

U.S. Pat. No. 5,974,456 issued to Naghshineh, et al., teaches a method for controlling the flow of input and output requests provided from multiple processors in a system to a given input/output device or input/output bus. The present invention is not limited to input/output requests within the system and is not invoked by operating system software or user programs operating on the system. Further, the method disclosed in the present invention does not affect the requested data in the system, but only the resources used to access data within the system.

U.S. Pat. No. 5,930,484 issued to Tran, et al., defines a system that uses dynamically variable width buses to process multiple requests onto a wide system bus shared by multiple processors. This patent teaches optimizing bus band width wherein the present invention defines a centralized method of allocating buffer space for the working space of an issued request within the system, and does not attempt to pack multiple data items together on a dynamically resized system bus.

U.S. Pat. No. 5,371,897 issued to Brown, et al., teaches a method of furnishing unique worldwide identifiers to an input/output subsystem so as to support configuration of the input/output devices after a fault within the system. Although Brown teaches use of node identifiers locally, the present invention does not bear on the subject of providing unique node identifiers on a global basis throughout the system.

U.S. Pat. No. 4,956,771 issued to Neustaedter, teaches a method of managing data buffers for an input/output controller device. The method in this referenced patent requires an extensive amount of software support in both the operating system and the input/output controller device to operate. The method taught in the present invention is independent of software and does not require the participation of input/output device controllers in order for the method to operate.

While management of memory resources across a distributed processing system have been addressed in various aspects by the patents set forth above and other disclosures, none have taught a method whereby one system component can be assigned the responsibility of allocating resources on a second system component when such first component is supplying the resource consuming operations. Credit based system resource management methods, as used in the past, do not provide for obtaining additional hardware resource information useful in managing and applying system resources as they apply to distributed systems throughout a multiprocessor computer system.

SUMMARY OF THE INVENTION

A first aspect of the invention is a method for handling resources of a multiprocessor system in which a requestor group of one or more processors of the system is interconnected to a target group of one or more processors of the system. In the method, the requestor allocates a resource of the target, the resource being associated with a request of the requestor. The requester then sends a result of the request to the target, and the target directly receives the result using the resource without intermediate handling of the resource. The requester and the target are preferably but not necessarily interconnected by a central hardware device, such that the requester allocates the resource by sending a request to the central hardware device which then allocates the resource at the target group.

A second aspect of the invention is a computing system having interconnected requestor and target groups of one or more processors each. A resource allocator receives and responds to requests of the requestor. The target is responsive to both a resource provided by the resource allocator and a result of the request from the requestor. The target directly receives the result responsive to the resource without intermediate handling of the resource by the target. The system preferably interconnects the requestor and the target using a central hardware device which includes the resource allocator, although the requestor can alternatively be interconnected directly.

BRIEF DESCRIPTION OF THE DRAWINGS

FIG. 2B is suggested for printing on the first page of the issued patent.

DETAILED DESCRIPTION OF THE PREFERRED EMBODIMENT

Overview

Figure 1:
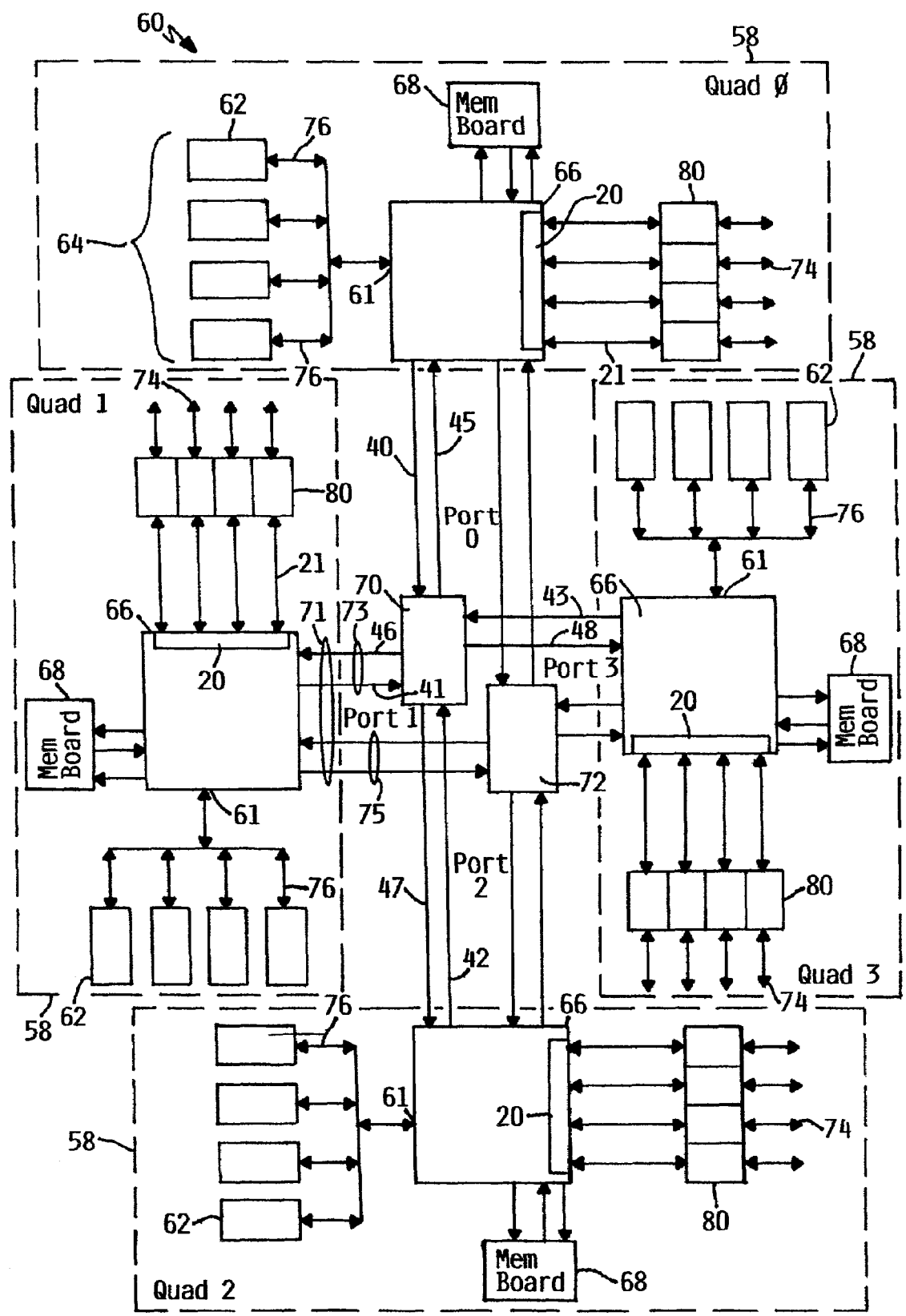
FIG. 1 is a block diagram of a four quad multiprocessor system including a tag and address crossbar system according to the preferred embodiment of the invention.

In multiprocessor computer systems comprised of more than one processing node, hardware resources such as temporary data buffers must be allocated dynamically. In the preferred embodiment, resources required to complete a transaction within a memory controller are identified as a transaction identifier (TrID). In the preferred embodiment, the allocating component is a communications pathway consisting of a tag and address crossbar system which allocates TrID resources that exist on the target components known as memory control agents. Each node of the multiprocessor system disclosed has a memory control agent which coordinates one or more processors in the node along with local system resources and communications with the crossbar system. The tag and address crossbar alone issues requests that cause the transaction identifiers (TrIDs) corresponding to resources inside the memory control agent to be allocated. When the memory control agent has completed work on the transaction, the memory control agent then deallocates the resources consumed by that transaction by using its interconnection with the crossbar. Data flow control and allocation of TrIDs are performed in advance and without time latency cost.

The allocating component in the system makes a request of a target component which includes information about the identification of the source node of the request and the source transaction unit object as well as the target node identification and the target transaction unit object. By transmitting this information in a data request initially to a target node, data transmission between the source and the target or back from the target to the source can be accomplished without further intervention by the component allocating the transaction unit object.

The TrID and resource handling method of the preferred embodiment first has the source node send a request (such as for a read or write of data) to the central device or crossbar communications pathway. The central device allocates the resources for any transactions that are required to complete that request, and assigns a TrID for the request. The central device responds back to the memory control agent of the source node indicating what action it needs to take, such as sending or receiving data across the data crossbar. The source node then sends the results to the target, which receives the results directly into the resource. In the case of a read request, the target node receives the original requestor's TrID and thereby knows where to send the data which the source node requested be read by the target.

Technical Background

The method of the preferred embodiment is used in a multiple processor system, configured in two or more independent processing nodes, which utilizes a tag and address crossbar system for use in combination with a data crossbar system, together comprising a data processing system to process multiple data read and write requests across the nodes. Typical multiprocessor systems utilize a communications pathway by implementation of one or more hardware devices which interconnect various groups of multiprocessors associated with memory which is local to such processors. Multiple processor groups are interconnected through such pathways utilizing systems known as tag and address crossbars and data crossbars, all acting together to allow the multiple processor subsystems to operate in a coordinated fashion. Such coordination is ordinarily accomplished by interconnection of the crossbar systems with a memory controller associated with each separate group of processors such that the crossbar communications pathway essentially interconnects such memory control systems. Memory control systems allow the processors from any node in the system to utilize memory local to it or memory local to other nodes which would, by definition, be remote to a processor not in such other node. Therefore, memory control systems in each processor node must interact through the crossbar system to allocate resources within the memory controller and otherwise communicate requests for data from other nodes and satisfy such requests.

In allocating hardware resources dynamically, the communications necessary to maintain the allocation can become problematic in terms of time by increased system latency, and additional cost for additional component count m coordinating data communications. Resources within a component such as a memory system are often allocated by that component itself, which requires adding communication paths between the components operating in a system to arbitrate for resources and the control of the flow of data so that data transmissions through the system do not exceed the amount of resources available at any time.

In order to reduce the system overhead in terms of latency and component requirement, a first system component can be assigned the responsibility of allocating resources of a second component, the target, when the first component is supplying the resource consuming operations such as memory reads or writes. One or more memory control agents may communicate between each other through the interconnecting crossbar. In the case where the target component is deallocating a resource, such as an internal buffer associated with a memory line, communication is still required so that the first component can observe the deallocations and thereby target the deallocated resource for immediate reuse. Allocation by the first component and deallocation by the target component has the desirable feature that the allocation latency is minimized, thereby increasing performance of the system.

Technical Details

FIG. 1 presents an example of a typical multiprocessor systems in which the present invention may be used. FIG. 1 illustrates a multi-processor system which utilizes four separate central control systems (control agents) 66, each of which provides input/output interfacing and memory control for an array 64 of four Intel brand Itanium class microprocessors 62 per control agent 66. In many applications, control agent 66 is an application specific integrated circuit (ASIC) which is developed for a particular system application to provide the interfacing for each microprocessors bus 76, each memory 68 associated with a given control agent 66, PCI interface bus 21, and PCI input/output interface 80, along with the associated PCI bus 74 which connects to various PCI devices.

FIG. 1 also illustrates the port connection between the tag and address crossbar 70 as well as data crossbar 72. As can be appreciated from the block diagram shown in FIG. 1, crossbar 70 and crossbar 72 allow communications between each control agent 66, such that addressing information and memory line and write information can be communicated across the entire multiprocessor system 60. Such memory addressing system is necessary to communicate data locations across the system, and to facilitate update of cache information located in the crossbars 70 and 72 regarding data validity and data locations.

A single quad processor group 58 is comprised of microprocessors 62, memory 68, and control agent 66. In multiprocessor systems to which the present invention relates, quad memory 68 is usually Random Access Memory (RAM) available to the local control agent 66 as local or home memory. A particular memory 68 is attached to a particular controller agent 66 in the entire system 60, but is considered remote memory when accessed by another quad or control agent 66 not directly connected to a particular memory 68 associated with a particular control agent 66. A microprocessor 62 existing in any one quad processor group 58 may access memory 68 on any other quad processor group 58. NUMA systems typically partition memory 68 into local memory and remote memory for access by other quads.

Every port of tag and address crossbar 70 is assigned to one of four control agents 66 by virtue of its physical connection between agent 66 and crossbar 70. Interconnections between tag and address crossbar 70 and data crossbar 72 to each of control agents 66 are accomplished through bus 71. Shown in FIG. 1 as a connection from tag and address crossbar 70 and data crossbar 72 to the control agent 66 in quad one, the bus is also referred to as a port. Though shown only at quad one, the configuration of bus 71 is duplicated for each quads 58 as can be appreciated by the connections for ports 0, 1, 2 and 3 shown in FIG. 1. Bus 73 is the portion of bus 71 that connects control agent 66 to tag and address crossbar 70. Bus 75 is the portion of bus 71 which connects the data crossbar 72 to each control agent 66. Each of the quads of the system demonstrated in FIG. 1, communicate to the remaining portions of the system through tag and address crossbar 70 as well as data crossbar 72 through channels defined as ports. Ports 0, 1, 2 and 3 are all shown on FIG. 1 interconnecting the crossbar systems with each quads control agent 66. All of the processor groups or quads 58 in FIG. 1 are connected in a similar fashion, as can be appreciated from the figure, utilizing interconnect bus 71 as shown in port 1 of FIG. 1. The crossbar systems, including the ports interconnecting the crossbars with each of the quads 58, are essentially a communication pathway connecting the processing nodes so that they may all share access to data stored throughout the system. Crossbar 70 provides a reply to any new requests for a data operation from any of the control agents 66. Such additional information which is tracked includes the transaction identification (TrID) on the source node for the transaction; the transaction type; whether the data is a full cache line or just a partial line of data; and if the operation involves a partial line of data, which part of the cache line to which the data is associated.

In most multiprocessor systems which utilize distributed system memory, each group of multiprocessor's acting as a single group, node, or quad as referenced in the preferred embodiment, control agent 66 must manage transactions throughout the system to assure that a request for data or other transaction within the system is directed to or communicated to the proper system node, utilizing the memory space desired. Considering FIG. 1, if control agent 66 in quad 1 receives a write request from one of its processors 62, each control agent 66 has a grouping of TrIDs it may assign to the request to keep track of the request within its system. Each control agent 66 communicates with tag and address crossbar 70 so that tag and address crossbar 70 may interact with the request. In the example using FIG. 1, a write request from agent 66 in quad 1 will be communicated to tag and address crossbar 70. In a particular instance, tag and address crossbar 70 will have stored within its tag memory the location to which control agent 66 in quad 1 must write that particular data. If the data should be written to memory 68 in quad 2, for example, tag and address crossbar 70 will communicate that information to control agent 66 in quad 1.

Tag and address crossbar 70 will assign a TrID corresponding to the resource in the target quad, in this example quad 2, and communicate that TrID back to the control agent 66 in quad 1. Control agent 66 will attach this TrID to the data corresponding to that write operation. Accordingly, a subsequent operation from control agent 66 in quad 1 can be the communication of the data which has been tagged with the TrID assigned by tag and address crossbar 70 directly to the other control agent 66 to which the data should be sent, in the example agent 66 of quad 2 in FIG. 1. However, the invention provides that the data and associated TrID moves to the target location by communications through the data crossbar 72.

Figure 2A:
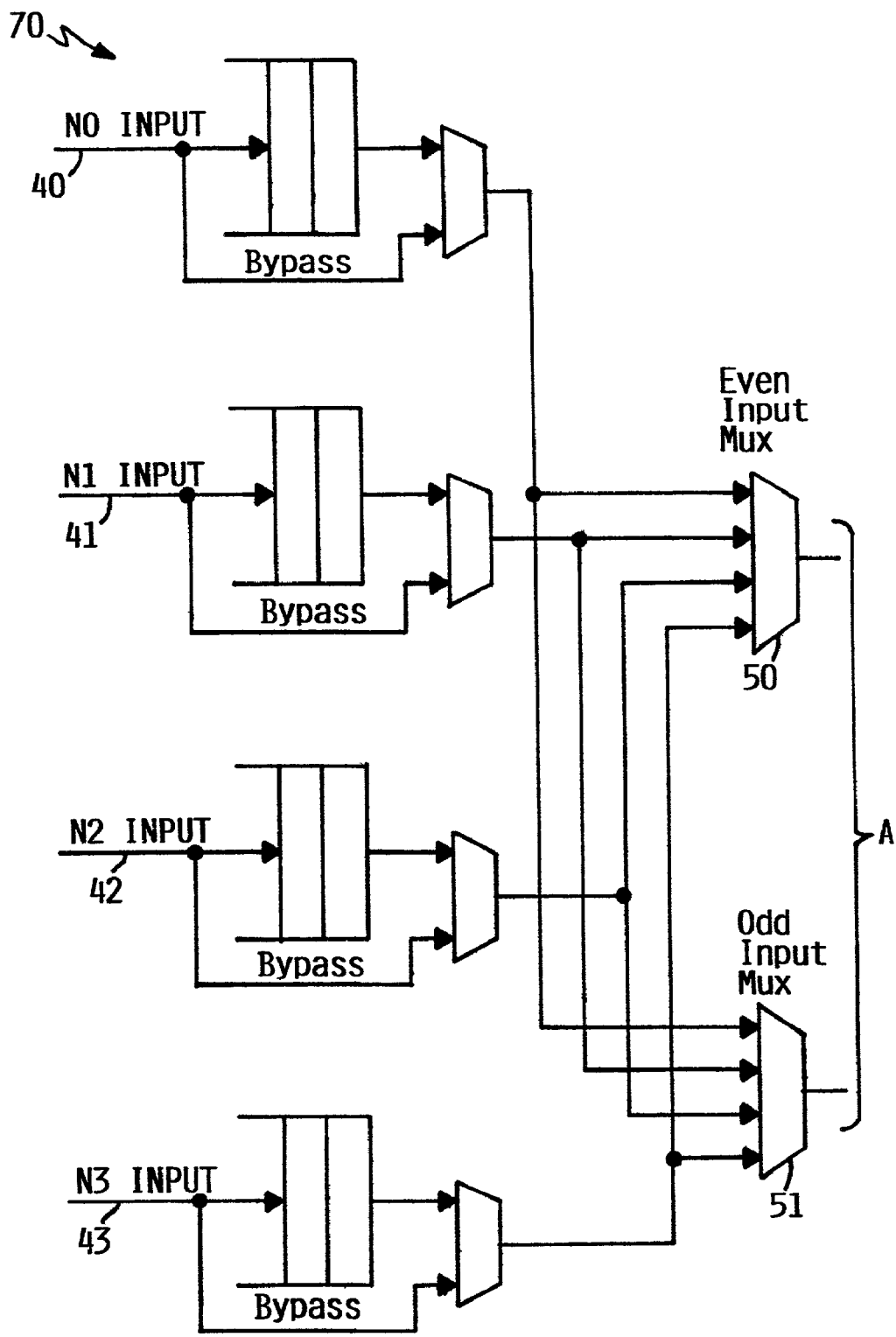
FIGS. 2A–2C are a block diagram of the tag and address crossbar system of FIG. 1.
Figure 2B:
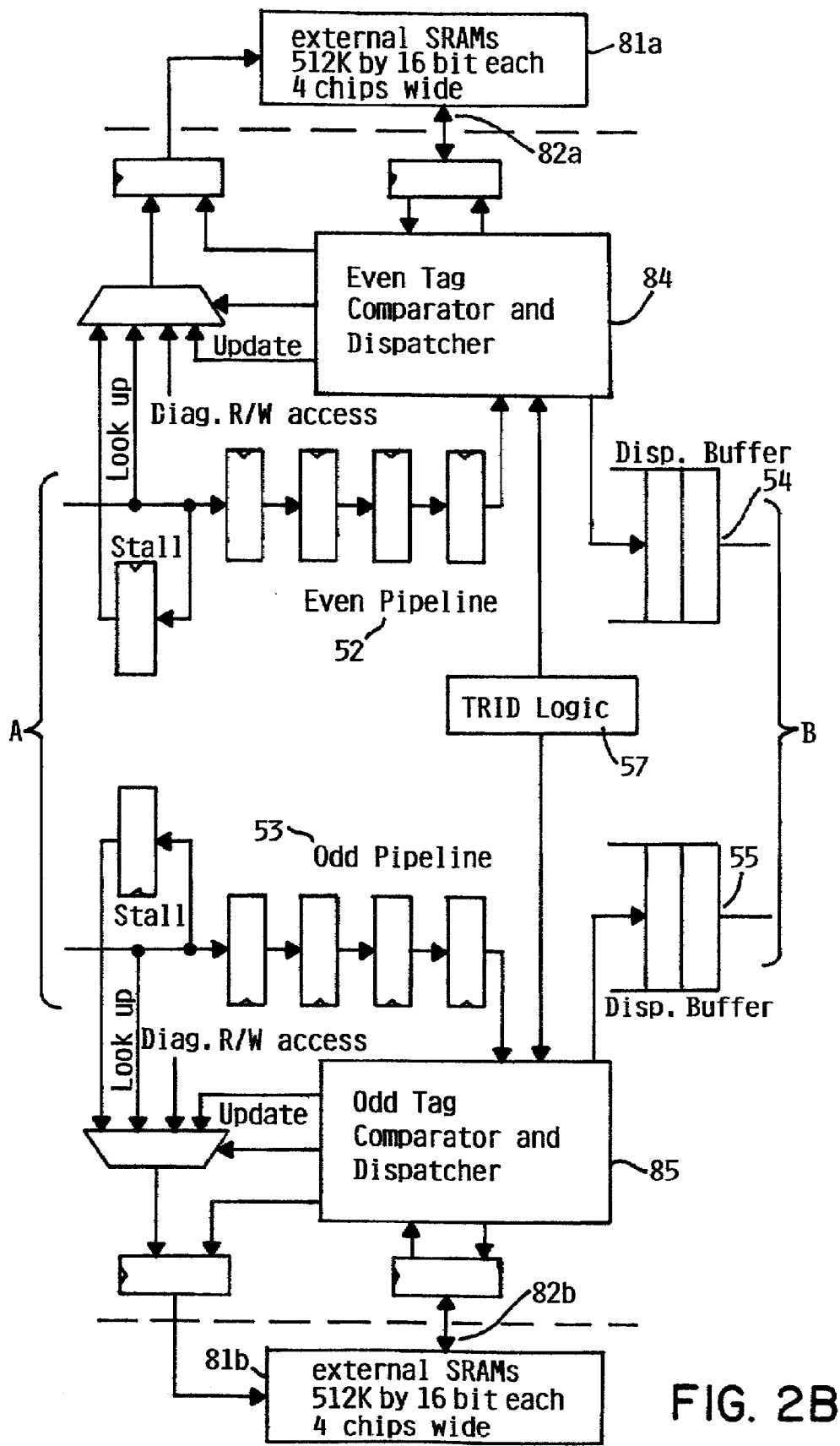
Figure 2C:
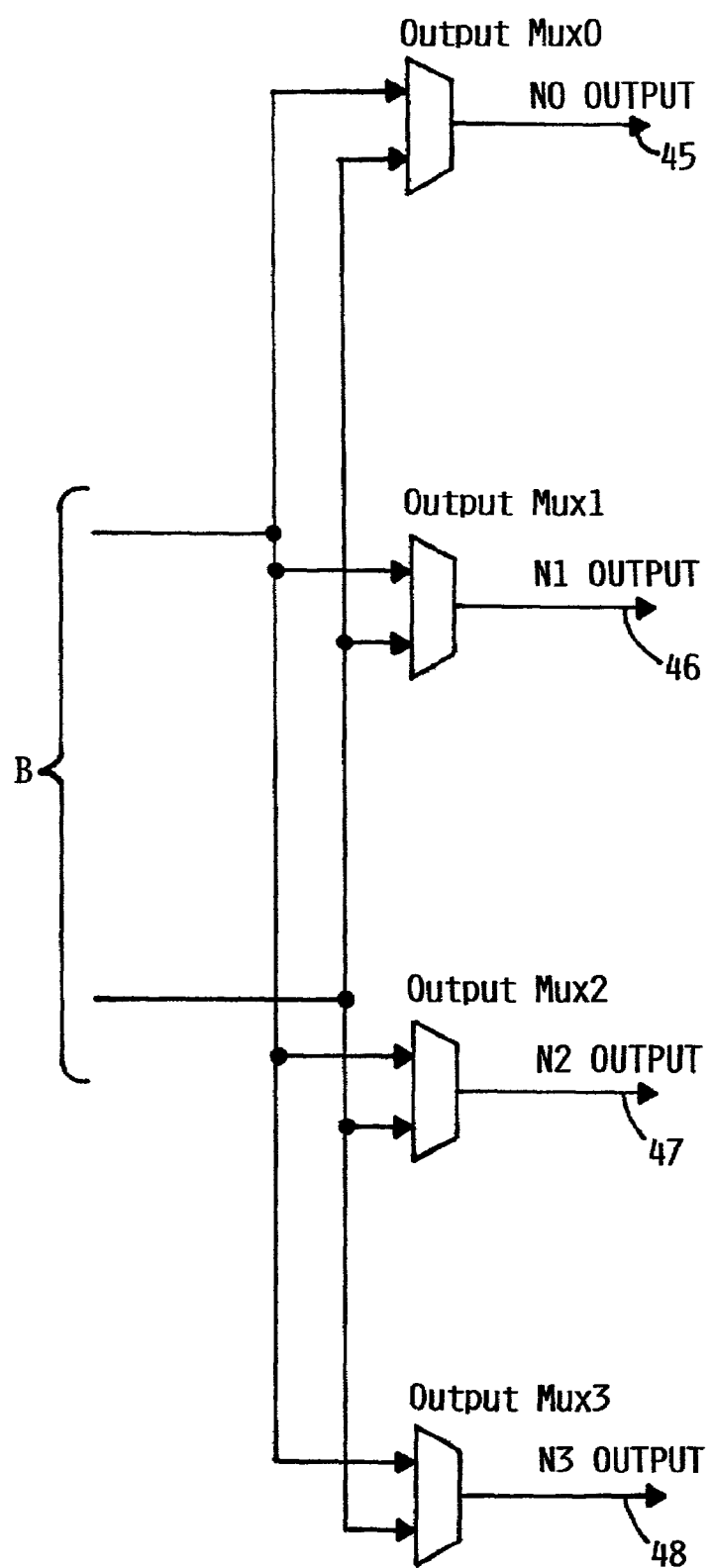

FIG. 2 (shown in multiple parts as FIGS. 2A–2C for clarity but representing a single diagram) illustrates internal logic of tag and address crossbar 70 shown in FIG. 1. Input 40 for port 0, input 41 for port 1, input 42 for port 2, and input 43 for port 3 illustrate part of the communications pathway connections each control agent 66 in each quad or node into tag and address crossbar 70. Likewise, FIG. 2 illustrates port 0 output 45, port 1 output 46, port 2 output 47 and port 3 output 48, each said output also illustrated on the entire system block diagram shown in FIG. 1. Tag memories which function with tag and address crossbar 70 are shown at 81(*a*) and 81(*b*). Registers 81(*a*) and 81(*b*) are identical except that they are associated with an even pipeline and odd pipeline for tag processing. The dual pipeline design is provided to reduce latency in the system by assigning processing to even numbered cache line addresses to the even pipeline and odd numbered cache line addresses to the odd pipeline so that simultaneous processing may occur.

Continuing with FIG. 2, input 40, 41, 42 and 43 are each introduced through a buffer, and through a split are operatively connected to even input multiplexor 50, and odd input multiplexor 51, the appropriate multiplexor (mux) being selected in accordance with the even or odd relationship with the input address. Each multiplexor 50 and 51 serves to serialize the flow of tags from the four inputs. The outputs of muliplexor 50 and 51 are sent to another multiplexor to be sent ultimately to tag memories 81(*a*) and 81(*b*). Even pipeline logic 52 and odd pipeline logic 53 evaluates the tags being presented and the request type to generate an output response and requests to the appropriate ports. The resulting output entries are buffered in the dispatch buffer 54 and 55, each of which is a first in, first out (FIFO) type buffer. Dispatch buffers 54 and 55 decouples timing variances between the tag logic shown and the output selection logic. Entries are stored in dispatch buffers 54 and 55 in first in, first out order until they can sent to the destination ports, being output 45, 46, 47 or 48, representing one output to each port or quad.

A TrID allocator 57 is responsible for managing TrIDs tag and address crossbar 70 makes available for outbound transactions. There is one TrID allocator 57 for each tag and address crossbar 70 Port. Each TrID allocator 57 manages sixteen TrIDs.

TrIDs managed by the TrID allocator 57 can be allocated and released. When allocating TrIDs, each of the TrID allocator 57 supplies TrIDs to both the even pipeline logic 52 and odd pipeline logic 53. TrIDs are allocated due to the generation of outbound transactions by the dispatcher 84, 85. Since there are two pipelines as shown in FIG. 2, each of the TrID allocators 57 can allocate up to four TrIDs per cycle.

The TrIDs managed by the TrID allocators 57 correspond to a set of resources in the control agent 66 attached to the same port. When all sixteen TrIDs are allocated, the control agent 66 has no more resources to support outbound tag and address crossbar 70 transactions. The dispatch buffer inhibits sending outbound transactions when TrIDs are unavailable, so flow control between tag and address crossbar 70 outbound transactions and the control agent 66 is based on TrID availability.

The control agent 66 can direct the TrID allocator 57 to release a TrID when it has completed using the resources associated with that TrID. To do so the control agent specifies which TrID is being deallocated. Such releases are routed from bus input logic communicating with input 40, 41, 42 and 43 for each port to the TrID allocator 57 for that port. A TrID allocator 57 can receive one TrID release per clock cycle.

The TrID allocator 57 contains a 16-bit register to keep track of which TrID's are available. After reset, all TrID's are made available to the TrID's allocator 57. The allocation of TrID's can be disabled by the TtrIDDis vector. The TtrIDDis vector is comprised of the TrID mask bits to selectively enable or disable a TrID. The TtrIDDis vector may be set by a control status register (CSR) access and is used to mask certain TrID's from the available pool of sixteen TrID's. A MMIONumTrIDs signal represents the maximum number of Memory Mapped Input/Output (MMIO) TrIDs permitted MMIONumTrIDs is also set by a CSR access to control the number of TrID's that may be allocated for MMIO transactions. The TrID allocator 57 keeps track of the number of currently allocated MMIO TrID's at any given time. If this number is greater than the MMIONumTrIDs value, MMIO requests will not be allowed to consume any more TrIDs. This function is necessary in order to prevent the case where MMIO requests consume all TrIDs and cause a deadlock condition to occur. A deadlock condition can occur in the system when multiple MMIO requests allocate all available target TrIDs. The MMIO TrIDs are thus resources which control the ability of a target control agent 66 to satisfy a memory mapped I/O transaction requested by another control agent.

TrID #15 is dedicated for a special transaction type called TLB Purge (TLBP). A dedicated TrID is required due to protocol restrictions. The operating system ensures that there is only one ongoing TLB Purge transaction at any one time. Thus, only one TrID needs to be reserved for a TLBP operation. Thus, TrID #15 is a resource which controls the ability of a target control agent 66 to satisfy a TLB Purge transaction requested by another control agent.

The dispatch buffer informs the TrID allocator 57 how many TrIDs are required for a given transaction.

Similar signals are sent from the TrID allocator 57 to the dispatch buffers to indicate what TrIDs are available. The TrID allocator 57 will always attempt to supply up to four distinct TrIDs (two per pipe line). The TrID allocator 57 does not know in advance whether a dispatcher needs MMIO or Cacheable TrIDs, so it makes both available. To do this, the TrID allocator 57 will report that two cacheable TrIDs and one MMIO TrID are available per pipeline. However, the dispatch buffer will take either cacheable or MMIO TrID, but not both. Because of this, the same TrID is made available as both a cacheable and a MMIO TrID.

Figure 3:
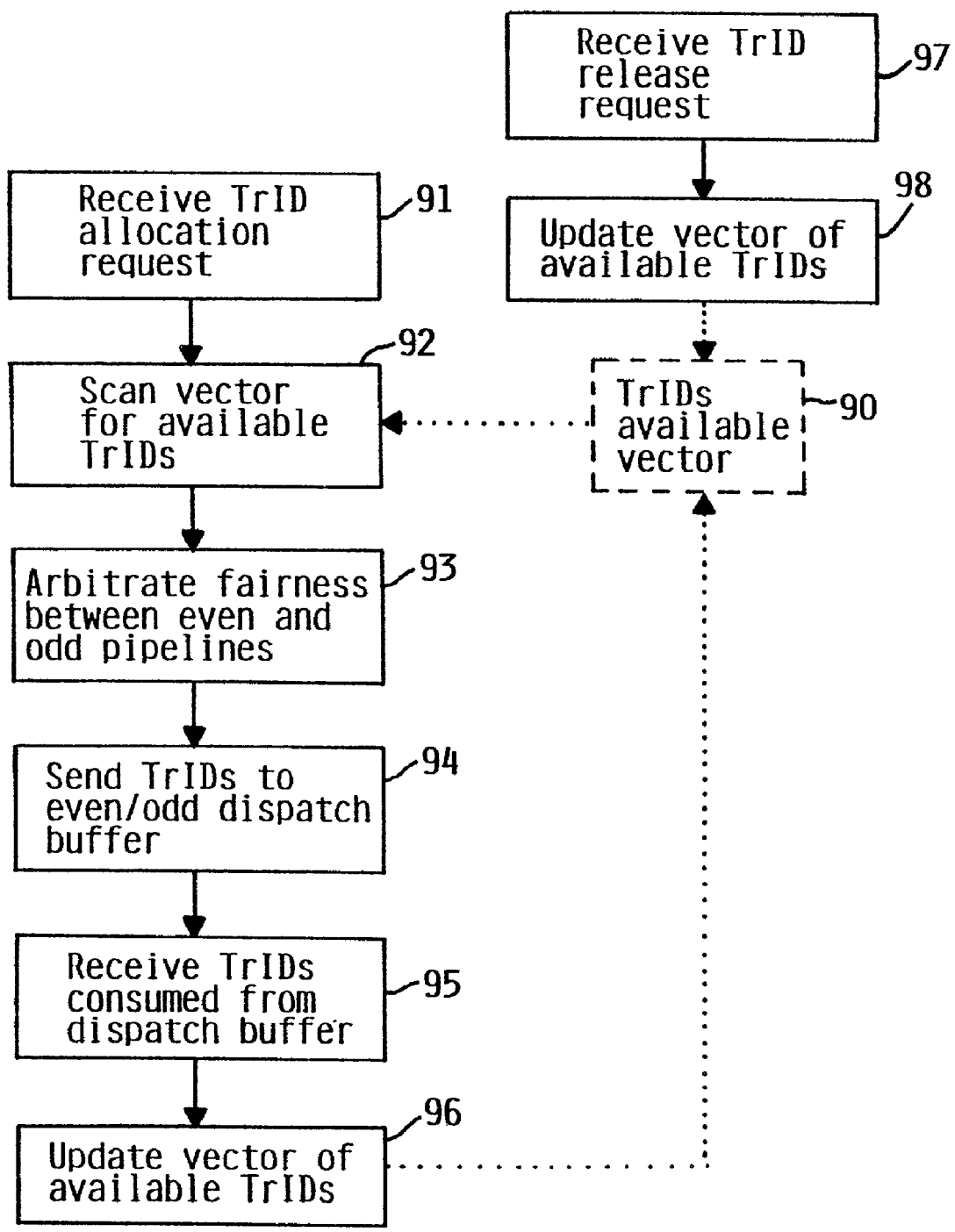
FIG. 3 is a flowchart showing the operation of the TrID allocator of FIG. 2.

As shown in FIG. 3, TrID allocation as performed by TrID allocator 57 begins when the TrID allocator receives a TrID allocation request from one of the control agents 66 (step 91). TrIDs are selected by scanning a sixteen bit TrID vector for available TrIDs (step 92). TrID #15 is reserved for TLBP transactions, and the other TrIDs may be disabled from selection by the CSR logic. The vector is scanned in descending order. The last TrIDs found (up to four) are passed to TrID arbitration logic (step 93), and the TrIDs resulting from the arbitration are distributed to the even and odd dispatch buffers (step 94). The selection logic provides up to four TrIDs. However, when TrIDs start being consumed and fewer are available to the point where four cannot be allocated, an arbitration scheme is used (step 93) so that the even or odd pipeline will be given a fair chance to obtain the necessary TrIDs. This arbitration is accomplished with a fairness bit that indicates whether the even or odd pipeline should win the allocation. The fairness bit is flipped each time a dispatch buffer takes a TrID.

In Table 1 below, the number of TrIDs found by the TrID allocator 57 are represented by the four-bit Found vector, which is preferably encoded one-hot. The corresponding TrID ID numbers are held in a sixteen-bit FoundTrIDs vector (four bits per ID). The TrIDAvailable signals (labeled in Table 1 as TrIDAvail and as even or odd, and even MMIO or odd MMIO) indicate the number and type of TrIDs being made available to the even and odd dispatch buffers 54 and 55 (step 94).

TABLE 1

TrID Available Truth Table

| Found | Fairness Bit | EvenTrIDAvail | OddTrIDAvail | EvenMMIOTrIDAvail | OddMMIOTrIDAvail |
|---|---|---|---|---|---|
| 0000 | Even | 00 | 00 | 0 | 0 |
| 0000 | Odd  | 00 | 00 | 0 | 0 |
| 0001 | Even | 01 | 00 | 1 | 0 |
| 0001 | Odd  | 00 | 01 | 0 | 1 |
| 0011 | Even | 11 | 00 | 1 | 0 |
| 0011 | Odd  | 00 | 11 | 0 | 1 |
| 0111 | Even | 11 | 01 | 1 | 1 |
| 0111 | Odd  | 01 | 11 | 1 | 1 |
| 1111 | Even | 11 | 11 | 1 | 1 |
| 1111 | Odd  | 11 | 11 | 1 | 1 |

The MMIO TrID will only be made available if the number of MMIO TrID already allocated is smaller than the maximum value specified by the CSR logic. It is possible to allocate one more MMIO TrID than the maximum value in the event that the number currently allocated is one less than maximum and the even and odd pipes both take an MMIO TrID simultaneously. An optimization is performed in the event that enough TrIDs are not available for one pipeline, and the other pipeline is being offered TrIDs that it does not need. In this case, the fairness bit is flipped. In the next clock cycle, the pipeline requiring the TrID will be satisfied.

TrID numbers are extracted from the FoundTrIDs vector shown in Table 2 and passed to dispatch buffer 54 or 55 (step 941), depending on whether the even or odd pipeline. One TrID number is sent for every TrID made available. The FIRSTTrID, SECONDTrID, MMIOTrID are signals sent from the TrID allocator 57 to the dispatch buffer. Table 2 below shows how TrIDs are selected for the even and odd dispatch buffers 54 and 55, respectively.

TABLE 2

TrID Selection

| Found | Fairness Bit | EFIRSTTrID (Even first TrID) | ESECONDTrID (Even secondTrID) | EMMIOTrID (Even MMIO TrID) | OFIRSTTrID ((Odd first TrID) | OSECONDTrID (Odd secondTrID) | OMMIOTrID (Odd MMIO TrID) |
|---|---|---|---|---|---|---|---|
| 0000 | Even | 0000 | 0000 | 0000 | 0000 | 0000 | 0000 |
| 0000 | Odd  | 0000 | 0000 | 0000 | 0000 | 0000 | 0000 |
| 0001 | Even | FoundTrIDs[3:0] | 0000 | FoundTrIDs[3:0] | 0000 | 0000 | 0000 |
| 0001 | Odd  | 0000 | 0000 | 0000 | FoundTrIDs[3:0] | 0000 | FoundTrIDs[3:0] |

TABLE 2-continued

TrID Selection

| Found | Fairness Bit | EFIRSTTrID (Even first TrID) | ESECONDTrID (Even secondTrID) | EMMIOTrID (Even MMIO TrID) | OFIRSTTrID ((Odd first TrID) | OSECONDTrID (Odd secondTrID) | OMMIOTrID (Odd MMIO TrID) |
|---|---|---|---|---|---|---|---|
| 0011 | Even | FoundTrIDs[3:0] | FoundTrIDs[7:4] | FoundTrIDs[3:0] | 0000 | 0000 | 0000 |
| 0011 | Odd | 0000 | 0000 | 0000 | FoundTrIDs[3:0] | FoundTrIDs[7:4] | FoundTrIDs[3:0] |
| 0111 | Even | FoundTrIDs[3:0] | FoundTrIDs[7:4] | FoundTrIDs[3:0] | FoundTrIDs[11:8] | 0000 | FoundTrIDs[11:8] |
| 0111 | Odd | FoundTrIDs[3:0] | 0000 | FoundTrIDs[3:0] | FoundTrIDs[11:8] | FoundTrIDs[7:4] | FoundTrIDs[11:8] |
| 1111 | Even | FoundTrIDs[3:0] | FoundTrIDs[7:4] | FoundTrIDs[3:0] | FoundTrIDs[11:8] | FoundTrIDs[15:12] | FoundTrIDs[11:8] |
| 1111 | Odd | FonndTrIDs[3:0] | FoundTrIDs[7:4] | FoundTrIDs[3:0] | FoundTrIDs[11:8] | FoundTrIDs[15:12] | FoundTrIDs[11:8] |

TrIDs selected and arbitrated remain available until they are used by the dispatch buffer. The dispatch buffer informs the TrID allocator 57 how many TrIDs of what type were taken (step 95). The TrID allocator 57 then updates its vector of available TrIDs in the next clock cycle (step 96). If the dispatch buffer has taken only one cacheable TrID, it is assumed that the TrID associated with FirstTrID was taken.

Control agent 66 releases a TrID by sending a control signal along with the TrID of the TrID to be released to the tag and address crossbar 70. These signals are forwarded to the TrID allocator 57 by the input logic on each input bus of tag and address crossbar 70, being input 40, 41, 42 and 43. The TrID allocator 57 receives these signals (step 97) and updates its vector of available TrIDs in the next clock cycle (step 98).

Advantages

The tag and address crossbar 70 allows the control agent 66 of a requester quad 58 to initiate a transaction requiring allocation of a TrID needed by the control agent of another, target quad for processing the transaction. The requestor quad can send the transaction to the target quad(s) without further action by the target quad(s), and the target quad(s) can receive the transaction directly using the TrID allocated by the requester quad, without further buffering or other intervention, thereby reducing the latency of the transaction and increasing the performance of the system.

Alternatives

The preferred embodiment of the invention as shown and described in detail is fully capable of obtaining the objectives of the invention. However, it should be understood that the described embodiment is merely an example of the present invention, and as such, is representative of subject matter which is broadly contemplated by the present invention.

While the invention is most beneficial in a system having central control device or system to communicate between nodes, and has been described as embodied in a system having tag and address crossbar and data crossbar systems which interconnect groups of processors employing non-uniform memory access or distributed memory across the system, the invention can be employed in any multiprocessor system having groups of one or more processors which exchange requests for resources, including those having no central device but which instead are directly interconnected to each other.

Further, while the preferred embodiment as described above utilizes sixteen microprocessors, comprised of four separate groups or quads of four processors each, with each quad having a memory control agent which interfaces with the central controller via crossbars, having memory boards allocated to the quad and for which the preferred embodiment functions to communicate through other subsystems to like controllers in the other quads, nevertheless the present invention may be used with any system having multiple processors, whether grouped into "nodes" or not, with separate memory control agents assigned to control each separate group of one or more processors when such group of processors requires coordination in handling the allocation of hardware resources for data transactions within a multi-node system. The present invention is there not limited to the specific numbers or arrangements of processors, or to the specific interconnect, described in the preferred embodiment.

Accordingly, the scope of the present invention fully encompasses other embodiments which may become apparent to those skilled in the art, and is limited only by the following claims.

We claim:

1. A method for handling resources of a multiprocessor system, comprising the steps of:
   a requestor group of one or more processors of the system allocating a resource of a target group of one or more processors of the system, the target being interconnected to the requestor, the resource being associated with a request of the requestor, allocating the resource comprising:
   the requestor sending a request to a central crossbar interconnecting the requestor and the target and separate from the requestor and the target;
   the central crossbar allocating the resource at the target group;
   the requestor sending a result of the request to the target; and
   the target directly receiving the result by using the resource without intermediate handling of the resource by the target.

2. The method of claim 1, further comprising the central crossbar assigning an identifier to the request.

3. The method of claim 1, further including the step of the target deallocating the resource.

4. The method of claim 1, wherein the resource controls access to a portion of a shared system memory of the target.

5. The method of claim 1, wherein the request is associated with a transaction between the requestor and the target.

6. The method of claim 5, wherein the resource is a transaction identifier of the transaction.

7. The method of claim 1, wherein the target comprises a first group and a second group of the processors, the first and second groups being interconnected.

8. A computing system, comprising:
a requestor group of one or more processors;
a resource allocator responsive to requests of the requestor; and
a target group of one or more processors, the target being interconnected to the requestor and responsive to a resource provided by the resource allocator and to a result of the request from the requestor;
a central crossbar interconnecting the requestor and the target and separate from the requestor and the target, the central crossbar comprising the resource allocator and requesting the resource at the target group;
wherein the target directly receives the result responsive to the resource without intermediate handling of the resource by the target.

9. The system of claim 8, wherein the resource allocator comprises one or more pipelines for handling requests.

10. The system of claim 8, wherein the central crossbar comprises a first crossbar for data interconnection and a second crossbar for control interconnection.

11. The system of claim 10, wherein the second crossbar is a tag and address crossbar.

12. The system of claim 8, wherein the resource controls allocation of a portion of shared system memory of the target.

13. The system of claim 8, wherein the resource is a transaction identifier.

14. The system of claim 8, wherein the target group of processors comprises interconnected first and second groups of processors.

15. In a multiprocessor computer system comprising a plurality of processing nodes; a shared, distributed system memory; and a central hardware device comprising a communications pathway connecting said processing nodes; wherein each one of said processing nodes includes at least one processor; and a portion of said shared system memory coupled to said processor and said communication pathway; said communications pathway comprised of communications ports each dedicated to communicating with one of said processing nodes wherein said communications pathway is separate from and interconnects said processing nodes and is further comprised of a tag and address crossbar to communicate tag and address information, and a data crossbar means for communicating data within the system; a method for handling tagging and addressing within the system comprising the steps of:
a first node communicating to said tag and address crossbar, a request for a transaction in the system;
allocating a transaction identifier in the tag and address crossbar for use by the identified transaction;
conveying said transaction identifier to an originating node;
attaching said transaction identifier to said transaction; and
communicating said transaction from the first node to the originating node which receives the transaction directly through said data crossbar means.

16. The method of claim 15, wherein the step of conveying said transaction identifier to the originating node is accomplished by conveying said identifier from said tag and address crossbar to said first node.

17. In a multiprocessor computer system capable of being partitioned into one or more independently functioning processing systems comprising:
a plurality of processing nodes, each node capable of operating independently;
a shared, distributed system memory;
and a communications pathway which interconnects said plurality of processing nodes;
wherein each one of said processing nodes includes at least one processor and a portion of said shared system memory coupled to said processor and said communication pathway, and said communication pathway is comprised of a central crossbar including tag and address means for communicating the identification of data transactions being processed through the system connected to said plurality of processing nodes, said tag and address means including means for storing information related to the identification of data including the target location for said data; and means for defining which memory location in one or more of said nodes, said data should be sent; the central crossbar interconnecting the nodes and is separate from the nodes;
a method for handling a request from a requestor node of the system to a target node of the system comprising the steps of:
the requestor node sending a request to the central crossbar;
the central crossbar allocating a resource to receive results of the request at the target node;
the central crossbar assigning an identifier to the request;
the requestor sending the results to the target node; and
the target node receiving the results directly into the resource without intermediate buffering of the results at the target node.

18. The method of claim 17, wherein said target node is comprised of more than one additional node.

* * * * *